United States Patent [19]
Saito et al.

[11] 4,067,288
[45] Jan. 10, 1978

[54] METHOD OF DETECTING PUNCTURE OF A PNEUMATIC TIRE

[75] Inventors: Shigeru Saito, Higashi-Yamato; Masahiko Suzuki, Kodaira; Takeshi Sato, Higashi-Yamato, all of Japan

[73] Assignee: Bridgestone Tire Company Limited, Tokyo, Japan

[21] Appl. No.: 742,324

[22] Filed: Nov. 16, 1976

[30] Foreign Application Priority Data

Nov. 25, 1975  Japan .................................. 50-140900

[51] Int. Cl.² .............................................. B60C 23/04
[52] U.S. Cl. ..................................... 116/34 R; 340/58
[58] Field of Search ................. 73/146.8, 146.3, 146.2; 116/34 R; 340/58; 200/61.25, 61.23

[56] References Cited
U.S. PATENT DOCUMENTS

| | | | |
|---|---|---|---|
| 2,649,518 | 8/1953 | Fuehring | 340/58 |
| 2,915,035 | 12/1959 | Russell | 116/34 R |
| 3,185,960 | 5/1965 | Howard | 340/58 |

*Primary Examiner*—Donald O. Woodiel
*Attorney, Agent, or Firm*—Sughrue, Rothwell, Mion, Zinn and Macpeak

[57] ABSTRACT

A method of detecting puncture of a pneumatic tire is disclosed. The method comprises guiding an internal pressure applied to the tire through a pressure outlet opening provided in that portion of a rim which is faced to a tube into an alarm means. The alarm means may be a whistle or a buzzer circuit which becomes operated when puncture occurs to produce alarm sound.

3 Claims, 4 Drawing Figures

METHOD OF DETECTING PUNCTURE OF A PNEUMATIC TIRE

This invention relates to a method of detecting puncture of a pneumatic tire.

Recent completion of paved roads and high speed highways has resulted in high speed running of automobiles. As a result, measures to prevent puncture of a tire wheel, particularly a safe measure for detecting the puncture such as an alarm means etc. have become an important problem to be taken into consideration.

Heretofore it has been common practice to use a tubeless tire as one measure of preventing an internal pressure applied to the tire from being suddenly decreased when a nail, for example, is driven into the tire. The tubeless tire, however, cannot be applied to two-wheeled vehicles such as a motor cycle since when the two-wheeled vehicle travels on roads and is subjected to a sudden turning movement, bead portions of the tire move and hence the internal pressure is leaked out through a gap formed between the bead portion and a rim, thereby removing the bead portion out of the rim. As a result, there is a risk of handling stability of the two-wheeled vehicle being remarkably degraded thus inducing unexpected accidents.

Thus, it is particularly desirous to use a tube closely in contact with the inner surface of the tire irrespective of the type of tires with or without the tube so as to prevent the bead portion of the tire from being removed out of the rim.

In the case of uniting the tire wheel which makes use of the tube with the rim, the tire becomes punctured by an internal cause such as bite of tube irrespective of the external cause such as defects due to a nail driven therein, so that it is still more important to detect such puncture of tire and alarm it.

Heretofore it has been the common practice to detect a reduction of the internal pressure applied to the tube indicate the presence of puncture, so that it was impossible to detect the puncture even when it occurred unless the internal pressure becomes reduced. In most cases, the internal pressure is not reduced without delay when the tire is punctured due not only to the internal cause but also to external types such as a nail driven into the tire and remaining as it is, thereby taking a considerably long time until the puncture is detected.

When tires are used under severe conditions, for example, under such conditions where two-wheeled vehicles, for example, are turned, the internal pressure applied to the tire suddenly leaked out of it thus inducing an unexpected accident.

An object of the invention, therefore, is to provide a method of detecting puncture of a pneumatic tire which can rapidly detect occurrence of puncture of an pneumatic tire including a tube incorporated therein and notify it to a driver irrespective of causes of occurrence of puncture and of presence or absence of substantial leakage of air.

The invention is based on such recognition that when a tube incorporated in a pneumatic tire is punctured, a centrifugal force acting on the tube causes that part of the tube which is adjacent to bead portions of the tire to be separated from an inner surface of the tire to produce gaps through which the internal pressure is transferred into a space formed between an outer surface of the tube and the inner surface of the tire, this transfer of the internal pressure being produced irrespective of presence or absence of leakage of the internal pressure toward outside of the tire. The invention makes use of the leakage of the internal pressure through the above mentioned gaps for the purpose of sensitively detecting puncture of the tire.

A feature of the invention is the provision of a method of detecting puncture of a pneumatic tire including a tube incorporated therein and a wheel rim hermetically sealed to bead portions of the tire, comprising guiding an internal pressure applied to the tire and leaked when the tire is punctured into a space formed between an outer surface of the tube and an inner surface of the tire through a pressure outlet opening provided in that portion of the rim which is faced to the tube into an alarm means mounted on and hermetically sealed to the pressure outlet opening.

In carrying out the invention into effect, therefore, it is required that a tube is incorporated into a tire irrespective of whether a tire is inherently provided with the tube or a tubeless tire, that use is made of a tire wheel having a tire to be united with a rim and adapted to be hermetically engaged with the rim, and that leakage of the internal pressure through a contact region of the bead portions of the tire with the rim is effectively prevented.

In addition, the pressure outlet opening through which the internal pressure produced in the space formed between the outer surface of the tube and the inner surface of the tire is provided in that portion of the rim which is faced to the tube. The alarm means is mounted on and hermetically sealed to the pressure outlet opening.

The invention will now be described in greater detail with reference to the accompanying drawings, wherein.

Figure 1:
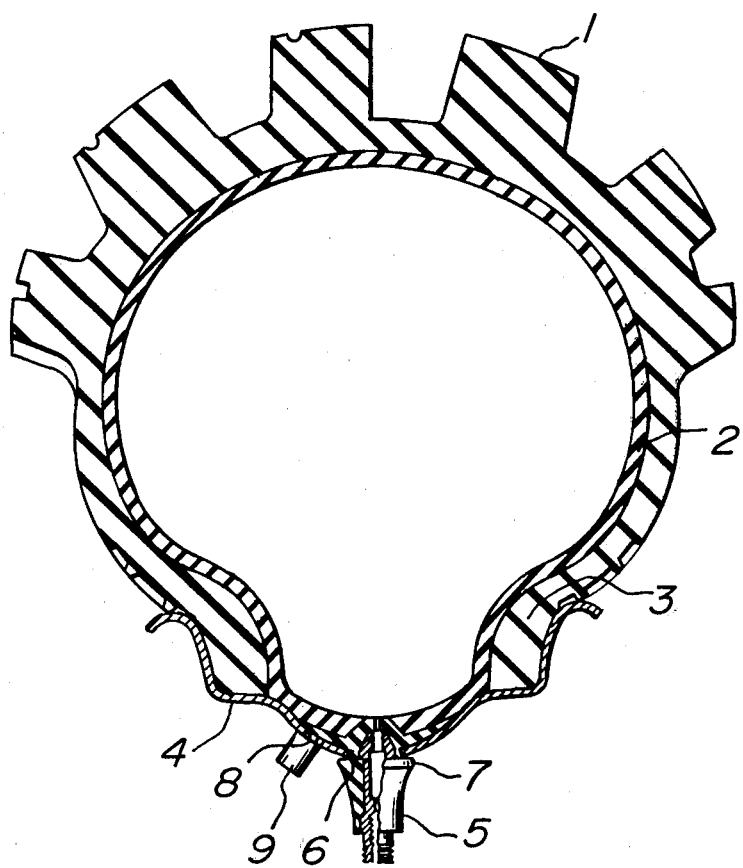
FIG. 1 is a cross-sectional view of a tire wheel practicing the method according to the invention showing main parts thereof before puncture.

Referring to FIG. 1 showing a cross-section of a tire wheel for two-wheeled vehicles, reference numeral 1 designates a pneumatic tire, 2 a tube, 3 a bead portion, 4 a rim and 5 an air inlet valve. The tire 1 may be a tire provided with a tube or a tubeless tire, but must always be provided with the tube 2 incorporated therein.

In the present embodiment, the rim 4 is a rim for tubeless tires and causes the bead portion 3 of the tire to be firmly engaged and hermetically sealed therewith. The air inlet valve 5 has its center opening extended through the rim 4 and communicates with an inner space of the tube 2. The air inlet valve 5 is provided at its end opposed to the rim 4 with an indicator ring 7 which is made integral with the air inlet valve 5 and firmly fitted around a hole 6 provided in the rim 4 so as to hermetically seal the hole 6. As a result, a contact surface between the rim 4 and the tube 2 on the one hand and a contact surface between the rim 4 and the bead portion 3 of the tire 1 on the other hand are hermetically sealed from atmospheric air.

Figure 2:
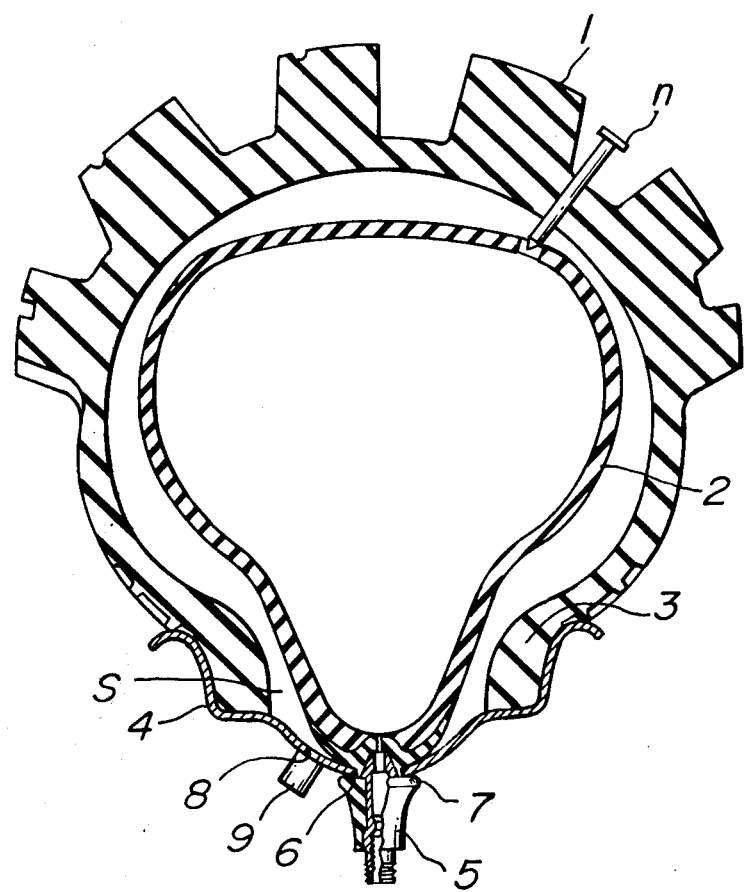
FIG. 2 is a similar view to FIG. 1, but showing main parts after puncture of the tire.

As shown in FIG. 2, if a nail n, for example, is driven into a tread of the tire 1, a hole is made also in the tube 2 urged under pressure against an inner surface of the tire 1, thereby inducing so-called puncture of the tire. In most cases, however, the nail n is maintained in its piercing state, so that an internal pressure applied to the tire is still remains in the tire for a short time.

Now, if a hole is made in the tube 2, the tube 2 tends to be contracted by a tension which opposes to the internal pressure therein. On the one hand, a centrifugal force is produced when the tire rotates on roads. This centrifugal force acts on the tube 2 and causes it to be separated from that part of the inner surface of the tire which makes contact with the bead portion 3 of the tire 1 as shown in FIG. 2. As a result, the internal pressure is introduced through a gap formed around the hole extended through by the nail n into a space s between an outer surface of the tube 2 and an inner surface of the tire 1 thus deforming the tube 2 into a pear-shape in section as shown in FIG. 2.

Under such stage, rubber surrounding the hole formed in the tire 1 by the nail n extended therethrough is firmly adhered to the nail n to prevent air from being leaked out of the tire 1. A driver, therefore, could not recognize occurrence of puncture of the tire 1. Even when the tube 2 becomes punctured due to any internal cause other than an external defect caused, for example, by the above mentioned nailed hole, the tube 2 is deformed into the pear-shape in section, but the driver could not recognize occurrence of puncture of the tube 2.

The invention is based on the above described recognition and makes use of air under pressure leaked into the space formed between the outer surface of the tube 2 and the inner surface of the tire 1 when the tire 1 or the tube 2 becomes punctured.

In accordance with the invention, the rim 4 is provided at that portion thereof which is directly faced toward the tube 2 with a pressure outlet opening 8 which is hermetically sealed by means of an alarm means 9. As a result, when the tire 1 or the tube 2 becomes punctured, air under pressure leaks into the space s between the outer surface of the tube 2 and the inner surface of the tire 1 and is exerted to the alarm means 9 which can detect occurrence of puncture at a time earlier than leakage of the internal pressure of the tire 1 out of the latter.

Figure 3:
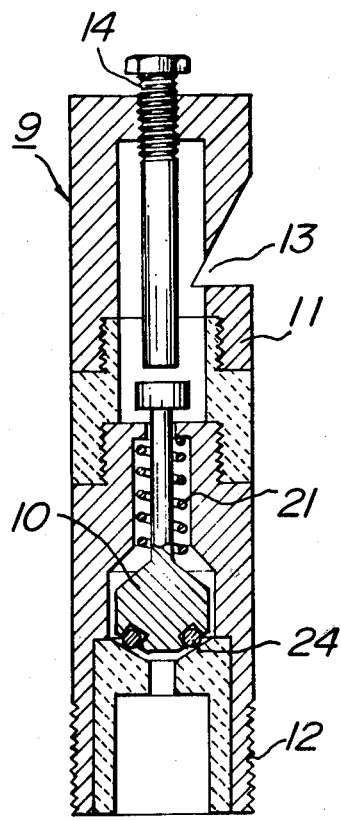
FIG. 3 is a cross-sectional view of one embodiment of an alarm means for detecting puncture of a pneumatic tire according to the invention.

In FIG. 3 is shown one embodiment of the alarm means 9 which is composed of a whistle cylinder 11 including a check valve 10 incorporated therein. Reference numeral 12 designates a threaded portion of the whistle cylinder 11 adapted to be threadedly engaged with the pressure outlet opening 8 and 13 shows a whistle for producing alarm sound.

The check valve 10 is normally urged against a valve seat 24 by a compression spring 21 so as to close the pressure outlet opening 8.

When the tire 1 or the tube 2 becomes punctured, the internal pressure leaked into the space s is exerted through the pressure outlet opneinig 8 to the check valve 10. Then, the check valve 10 becomes opened against the action of the compression spring 21 and the internal pressure is forcedly delivered through the whistle 13 thus producing alarm sound.

It is preferable that the whistle cylinder 11 is provided at its outer end with a control stem 14 by which the driver can forcedly close the check valve 10 after he has detected occurrence of puncture by notifying the alarm sound produced by the whistle 13. As a result, the punctured tire can travel on roads to any desired place where the punctured tire can be repaired.

Figure 4:
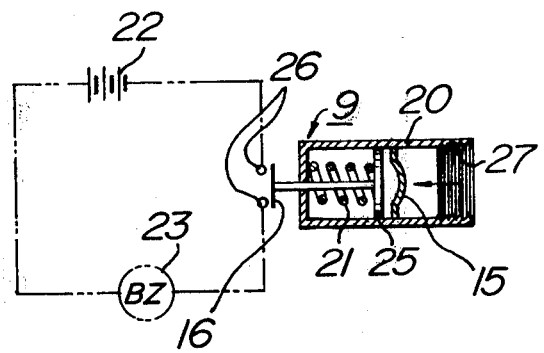
FIG. 4 is a cross-sectional view of a modified embodiment of the alarm means shown in FIG. 3.

In FIG. 4 is shown another embodiment of the alarm mean 9. In the present embodiment, the alarm means 9 is composed of a pressure responsive cylinder 20 including a pressure responsive member such as a flexible membrane 15, a piston 25 slidably arranged in the pressure responsive cylinder 20 and a switch 16 secured to an outer end of a piston rod and normally biased by a compression spring 21 to open contacts 26 of an alarm circuit including an electric source 22 and a buzzer 23. The pressure responsible cylinder 20 is secured through a threaded portion 27 provided in its outer end to the internal pressure outlet opening 8 with the aid of a proper joint.

In the present embodiment, if the tire 1 or the tube 2 becomes punctured, the internal pressure of the tire is guided through the pressure outlet opening 8 to the flexible membrane 15 which is then deflected to apply pressure to the piston 25. The piston 25 is then moved against the action of the spring 21 to cause the switch 16 to close the contacts 26, thereby energizing the buzzer 23 and hence producing alarm sound therefrom. In the present invention, the switch 16 may forcedly be separated from the contacts 26 by the driver after he has detected occurrence of puncture for the purpose of maintaining the internal pressure of the tire and hence permitting the tire 1 to travel on roads to any place where he can repair the tire 1.

Comparison tests have been made on a tire for two-wheeled vehicles having a size 4.00–18 and including a tube having a size 3.75/4.00–18 incorporated therein and pressurized by an internal pressure of 2.25 Kg/cm$^2$. When the tire was punctured, a conventional detection method responded to reduction of the internal pressure and detected it after 40 to 60 minutes with a pierced nail remaining in place and after 10 to 20 minutes with the pierced nail removed immediately after it has been driven into the tire, and that the method according to the invention responded to reduction of the internal pressure produced when the tire was punctured and detected it only after several seconds to some dozen seconds.

In the above comprison tests, a nail having a length of 30 mm was driven into a tread of the tire by a hammer. Both the tire with the nail remaining in place and the tire with the nail pulled out immediately after it has been driven therein were rotated on an indoor drum type testing machine until the tire arrived at its peripheral speed of 60 Km/h and a time passed for the tire from its start to detection of puncture was measured. Experimental tests have demonstrated that the method according to the invention is capable of still more shortening of response time for a tire used for travel on roads until detection of puncture, which has mainly been problem in practice. This is because of the fact that the above mentioned centrifugal force causes the transfer of the internal pressure of the tire from the inside of the tube toward the outside thereof produced when the tire travels on roads to be accelerated.

As stated hereinbefore, the invention has advantages that even when a tire wheel is used under particularly severe conditions there is no risk of the tire being removed from a rim, that occurrence of puncture of the tire due to such internal cause as described as well as due to external cause produced, for example, when a nail is driven into the tire can reliably be detected earlier than practical leakage of the internal pressure of the tire toward the outside of the tire. The tire wheel can travel on roads in safety, and that a running distance of the tire wheel after it has been punctured is made long enough that vehicles may be moved to any suitable place where the punctured tire can be repaired.

What is claimed is:

1. A method of detecting puncture of a pneumatic tire having an inner tube provided with an air inlet valve and incorporated within the tire, a wheel rim united with said tire and inner tube and provided with an alarm means and a valve hole engaged with said air inlet valve, bead portions of said tire and said inner tube being hermetically sealed to said wheel rim, comprising the steps of introducing, when said tire is punctured, that inflation pressure which is leaked into a normally closed region between an outer surface of said inner tube and an inner surface of said tire into a normally closed space between said bead portion, said inner tube and said rim by contraction of said inner tube, and operating said alarm means by the action of said introduced pressure in said space.

2. A method according to claim 1 wherein, said alarm means is a whistle cylinder including a check valve incorporated therein biased by an action of a spring, and a whistle for producing alarm sound when the introduced pressure guided is subjected to said check valve to open it against the action of the spring.

3. A method according to claim 1 wherein, said alarm means is a pressure responsive cylinder including a pressure responsive member subjected to the introduced pressure guided, said cylinder including a piston slidably arranged in said pressure responsive cylinder and a switch operatively connected to said piston and adapted to close a buzzer circuit when the introduced pressure is subjected to said pressure responsive member.

* * * * *